(12) United States Patent
Meek et al.

(10) Patent No.: US 8,209,340 B2
(45) Date of Patent: Jun. 26, 2012

(54) EFFICIENT FUNCTIONAL REPRESENTATION OF RESULT SHAPING

(75) Inventors: Colin Joseph Meek, Redmond, WA (US); Stephen Frederick Starck, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 12/059,056

(22) Filed: Mar. 31, 2008

(65) Prior Publication Data

US 2009/0248649 A1  Oct. 1, 2009

(51) Int. Cl.
*G06F 17/30* (2006.01)
(52) U.S. Cl. ........................................................ 707/753
(58) Field of Classification Search ................ None
See application file for complete search history.

(56) References Cited

U.S. PATENT DOCUMENTS

| | | | | |
|---|---|---|---|---|
| 6,134,540 A * | 10/2000 | Carey et al. | ............................ | 1/1 |
| 6,263,328 B1 * | 7/2001 | Coden et al. | ............................ | 1/1 |
| 6,477,527 B2 * | 11/2002 | Carey et al. | ............................ | 1/1 |
| 6,704,731 B2 * | 3/2004 | Masuoka et al. | ............... | 370/270 |
| 6,853,997 B2 | 2/2005 | Wotring et al. | | |
| 6,931,391 B2 * | 8/2005 | Tang et al. | ..................... | 707/776 |
| 7,028,028 B1 * | 4/2006 | Balmin et al. | ................ | 707/760 |
| 7,162,485 B2 * | 1/2007 | Gottlob et al. | ................ | 707/769 |
| 7,171,408 B2 * | 1/2007 | Zuzarte | ................. | 1/1 |
| 7,346,608 B2 * | 3/2008 | Annau et al. | ............................ | 1/1 |
| 7,403,956 B2 * | 7/2008 | Vaschillo et al. | ............ | 707/770 |
| 7,467,128 B2 * | 12/2008 | Larson et al. | ............................ | 1/1 |
| 7,478,363 B2 * | 1/2009 | Kobayashi | ..................... | 717/106 |
| 7,526,501 B2 * | 4/2009 | Albahari et al. | ..................... | 1/1 |
| 7,533,111 B2 * | 5/2009 | McCollum | ............................ | 1/1 |
| 7,680,767 B2 * | 3/2010 | Adya et al. | ............ | 707/999.002 |
| 2001/0051949 A1 * | 12/2001 | Carey et al. | ............... | 707/103 R |
| 2003/0084025 A1 * | 5/2003 | Zuzarte | ............................ | 707/2 |
| 2003/0236784 A1 * | 12/2003 | Tang et al. | ........................ | 707/6 |
| 2004/0060007 A1 * | 3/2004 | Gottlob et al. | ................ | 715/513 |
| 2005/0005261 A1 * | 1/2005 | Severin | ......................... | 717/108 |
| 2005/0010565 A1 * | 1/2005 | Cushing et al. | .................... | 707/3 |
| 2005/0050068 A1 | 3/2005 | Vaschillo et al. | | |
| 2005/0080766 A1 * | 4/2005 | Ghatare | ............................ | 707/3 |
| 2005/0097092 A1 * | 5/2005 | Annau et al. | ..................... | 707/3 |
| 2005/0097187 A1 | 5/2005 | Thompson et al. | | |
| 2006/0020582 A1 * | 1/2006 | Dettinger et al. | ................ | 707/3 |
| 2006/0041584 A1 | 2/2006 | Debertin et al. | | |
| 2006/0161523 A1 * | 7/2006 | Dettinger et al. | ................ | 707/3 |

(Continued)

OTHER PUBLICATIONS

Castro, Pablo, et al., "ADO.NET Entitty Framework: Raising the Level of Abstraction in Data Programming," Jun. 12-14, 2007, ACM SIGMOND '07, pp. 1070-1072.*

(Continued)

*Primary Examiner* — Farhan Syed

(57) ABSTRACT

A result shaping methodology is part of a bridge (translation layer) between an entity provider and an underlying store provider. The bridge accepts command trees and parameter values from a consumer (e.g., the entity provider), reshapes the trees as necessary for its underlying store provider to execute, executes resulting commands, and assembles the results from the commands into the nested data reader that the initial command tree requested. The result assembly advantageously takes a mapping declaration and compiles it into a set of expression definitions composed from a small number of simple functions. Each collection in the result has a corresponding expression describing how collection elements are realized given relational results. Other expressions describe boundary detection behavior. These expressions are compiled into functions used to shape relational data into arbitrary object graphs or streaming interfaces. Alternative versions of the expressions for performance or graceful contextual error handling are also compiled.

19 Claims, 14 Drawing Sheets

U.S. PATENT DOCUMENTS

| | | | |
|---|---|---|---|
| 2006/0173861 A1* | 8/2006 | Bohannon et al. | 707/100 |
| 2007/0027905 A1 | 2/2007 | Warren et al. | |
| 2007/0055692 A1* | 3/2007 | Pizzo et al. | 707/103 R |
| 2007/0226196 A1* | 9/2007 | Adya et al. | 707/3 |
| 2007/0226203 A1* | 9/2007 | Adya et al. | 707/4 |
| 2007/0282916 A1* | 12/2007 | Albahari et al. | 707/200 |
| 2008/0228697 A1* | 9/2008 | Adya et al. | 707/2 |
| 2008/0294596 A1* | 11/2008 | Xiong | 707/2 |
| 2008/0319957 A1* | 12/2008 | Muralidhar et al. | 707/4 |
| 2009/0125495 A1* | 5/2009 | Zhang et al. | 707/4 |
| 2009/0248649 A1* | 10/2009 | Meek et al. | 707/4 |
| 2009/0248650 A1* | 10/2009 | Xian et al. | 707/4 |
| 2010/0047760 A1* | 2/2010 | Best et al. | 434/362 |

OTHER PUBLICATIONS

Lammel, Ralf, "LINQ to XSD," Jan. 20, 2007, ACM SIGPLAN Workshop on Programming Language Technologies for XML, pp. 1-2.*

Torgersen, Mads, "Querying in C#: How Language Integrated Query (LINQ) works," Oct. 21-25, 2007, ACM OOPSLA '07, pp. 852-853.*

Meijer, Erik, "LINQ; Reconciling objects, relations, and XML in the .NET framework," Jun. 27-29, 2006, ACM SIGMOND 2006, p. 1.*

Wang, Kan and Zheng, Yujun, "Using LINQ as an Instructional Bridge Between Object-Oriented and Database Programming," IEEE, 2009, Proceedings of the 2009 4th International Conference on Computer Science & Education, 1464-1468.*

Giovanni Guardalben, et al. Integrating XML and Relational Database Technologies: A Position Paper, Revised Aug. 12, 2004 http://www.hitsw.com/products_services/whitepapers/integrating_xml_rdb/integrating_xml_white_paper.pdf. Last accessed Mar. 20, 2008, 24 pages.

Behzad Bordbar, et al. Integrated Model-Based Software Development, Data Access, and Data Migration http://www.cs.bham.ac.uk/~bxb/Papres/UML2005.pdf. Last accessed Mar. 20, 2008, 15 pages.

Jeffery M. Barnes. Object-Relational Mapping as a Persistence Mechanism for Object-Oriented Applications, Apr. 28, 2007 http://digitalcommons.macalester.edu/context/mathcs_honors/article/1006/type/native/viewcontent/. Last accessed Mar. 20, 2008, 113 pages.

Xinhua Gu. Generation of EJB3 Artifacts in a Modeling Platform, May 26, 2006, Master Thesis. http://www.sts.tu-harburg.de/pw-and-m-theses/2006/gu06.pdf. Last accessed Mar. 20, 2008, 105 pages.

* cited by examiner

| Reader,type=Customer | | | | 660 |
|---|---|---|---|---|
| CustID | CustName | Orders | | Contacts |
| 101 | Joe's Bar and Grille | Reader,type=Order ||| Reader,type=Contact |
| | | OrderID | OrderDate | OrderAmt | ContactName |
| | | 9998 | 12/5/2005 | 1234.60 | Joe |
| | | 9999 | 12/12/2005 | 2367.60 | Jack |
| | | | | | Jim |
| 102 | Jane's Beanery | Reader,type=Order ||| Reader,type=Contact |
| | | OrderID | OrderDate | OrderAmt | ContactName |
| | | 9996 | 12/5/2005 | 24.60 | Jane |
| | | 9997 | 12/12/2005 | 67.60 | Julie |

| Top Record Part | Customer Part | | Order Part | | | | | Contact Part | | |
|---|---|---|---|---|---|---|---|---|---|---|
| NST1 | ESID1 | CustID | CustName | CD1 | ESID2 | OrderID | OrderDate | OrderAmt | ESID3 | Contact |
| 1 | 1 | 101 | Joe's Bar and Grille | D1 | 1 | 9998 | 12/5/2005 | 1234.60 | (null) | (null) |
| 1 | 1 | 101 | Joe's Bar and Grille | D1 | 1 | 9999 | 12/12/2005 | 1234.60 | (null) | (null) |
| 1 | 1 | 101 | Joe's Bar and Grille | D2 | (null) | (null) | (null) | (null) | 1 | Joe |
| 1 | 1 | 101 | Joe's Bar and Grille | D2 | (null) | (null) | (null) | (null) | 1 | Jack |
| 1 | 1 | 101 | Joe's Bar and Grille | D2 | (null) | (null) | (null) | (null) | 1 | Jim |
| 1 | 1 | 102 | Jane's Beanery | D1 | 1 | 9996 | 12/5/2005 | 24.60 | (null) | (null) |
| 1 | 1 | 102 | Jane's Beanery | D1 | 1 | 9997 | 12/12/2005 | 67.60 | (null) | (null) |
| 1 | 1 | 102 | Jane's Beanery | D2 | (null) | (null) | (null) | (null) | 1 | Jane |
| 1 | 1 | 102 | Jane's Beanery | D2 | (null) | (null) | (null) | (null) | 1 | Julie |

| Top Record Part | Customer Part | | Order Part | | | | | Contact Part | | |
|---|---|---|---|---|---|---|---|---|---|---|
| NST1 | ESID1 | CustID | CustName | CD1 | ESID2 | OrderID | OrderDate | OrderAmt | ESID3 | Contact |
| 1 | 1 | 101 | Joe's Bar and Grille | D1 | 1 | 9998 | 12/5/2005 | 1234.60 | | |
| 1 | | | | D1 | 1 | 9999 | 12/12/2005 | 1234.60 | | |
| 1 | | | | D2 | | | | | 1 | Joe |
| 1 | | | | D2 | | | | | 1 | Jack |
| 1 | | | | D2 | | | | | 1 | Jim |
| 1 | | 102 | Jane's Beanery | D1 | 1 | 9996 | 12/5/2005 | 24.60 | | |
| 1 | | | | D1 | 1 | 9997 | 12/12/2005 | 67.60 | | |
| 1 | | | | D2 | | | | | 1 | Jane |
| 1 | | | | D2 | | | | | 1 | Julie |

690, 680

EFFICIENT FUNCTIONAL REPRESENTATION OF RESULT SHAPING

BACKGROUND

More and more frequently, computers are being used to perform various information location and retrieval tasks. Commonly, these information location and retrieval tasks have primarily been in the domain of specialized applications that have been constructed to perform queries against a relational database using a specialized query language. Among the most common of such query languages is the structured query language (SQL). However, recent and dramatic advances in computing technology, for example, increases in processor power and speed and increases in information storage capabilities, have enabled a greater range of information location and retrieval applications on a wider variety of computers.

Traditionally, there have been two main approaches to include information location and retrieval abilities in compiled applications that are written in a high-level programming language. In accordance with the first approach, text of queries written in a query language such as SQL can be encoded as strings within a compiled application program. During execution of the program, text of the query can be passed to a function from an application programming interface (API) that can pass the query to a database to obtain information that result from performance of the query. With the second approach, an embedded text representation of a query is extracted from a source code file by a compiler. The compiler rewrites the query to use an API and re-encodes the query as a text string. These existing techniques suffer from complexity, poor performance, and inexact error reporting.

Recently, querying languages such as extended structured query language (eSQL) and language integrated query (LINQ) have been developed that allow queries of conceptual data, unlike SQL that is intended for pure relational data. Rather than merely getting back fixed number of columns with simple values interpreted for each position, these newer querying languages can get back type information. This capability is leveraged in a platform supporting transformation of data from one domain to another, for instance an Object Relational Mapping System, where large amounts of data needs to be efficiently transformed from one shape to another, for example from relational rows to arbitrarily structured results.

One approach for supporting such queries is to compile a query plan into a procedural method in order to obtain the processing efficiencies. However, such an approach suffers from the complexities of compiling procedures and often has poor error handling. Another approach has been a live interpretation of a description of a pattern with respect to the data, which avoids some of the complexities of compiling procedural methods but lacks the efficiencies of precompiled paths.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that leverage an expression library capable of describing shaping functions. Descriptions of a function are transformed into methods with a description of the shaping function maintained. First, every element that is returned, be it a simple element or an element of a nested collection, is represented as a method created on the fly as a fairly simple representation, which is compiled to gain processing efficiencies. Second, the assembly of the method from layering of expressions composed from a small number of simple functions is tracked to enable two-way visibility into the process. Thus, when the results are obtained, the expressions that created these structures are known for interpreting the results. Third, with this visibility in the layering of expressions, multiple versions of the same compiled method can be created to trade off performance for graceful error handling.

In accordance with one aspect of the subject innovation, a method is provided for result shaping of transforming rectangular, relational data from a data store into arbitrarily structured results. A set of expression definitions are compiled for a mapping declaration to initialize a result assembly. A plurality of coordinators are tracked that handle materialization respectively of results for each step of the result assembly. Query data results are demulitplexed by identifying the coordinator for each collection element of the query data results.

In another aspect, an apparatus is provided for result shaping of transforming rectangular, relational data from a data store into arbitrarily structured results. A user interface receives an entity query of conceptual data. A computer readable memory comprises a bridge for causing a computer to process the entity query. The bridge further comprises a result assembly component for assembling a set of expression definitions for a mapping declaration for a pattern derived from the entity query, an expression compiler for compiling the set of expression definitions, a tracking component for tracking a plurality of coordinators that handle materialization respectively of results for each step of the result assembly, and a result demultiplexing component for processing the query data results by identifying the coordinator or coordinators for each element of the query data results.

In an additional aspect, a method is provided of result shaping of transforming rectangular, relational data from a data store into arbitrarily structured results. A set of expression definitions are compiled for a mapping declaration to initialize a result assembly retrieved from an expression library for a query language that can describe shaping functions, the expressions selected from a plurality of stateless functions usable in a cache without recompilation. A coordinator is created that encapsulates logic to materialize a particular result collection. A key is defined demarcating a boundary or chapter for a coordinator whose change indicates a new result. Transformations are described that are needed to take results of executing a relational store command to produce post-relational entity results in a column map by telling a materializer how to group columns in complex types of sub-structures and how to group rows into inline collection nested results. A plurality of coordinators are tracked that handle materialization respectively of results for each step of the result assembly. Query data results are demultiplexed by identifying the coordinator or coordinators for each row of the query data results. Optimization of a result shaping function is made by tailoring based upon data available at runtime.

The following description and the annexed drawings set forth in detail certain illustrative aspects of the claimed subject matter. These aspects are indicative, however, of but a few of the various ways in which the principles of the innovation may be employed and the claimed subject matter is intended

BRIEF DESCRIPTION OF THE DRAWINGS

FIG. 10 illustrates a diagram of an exemplary table result with two normal columns and two nested collection expected to be returned from the bridge to a consumer.

FIG. 11 illustrates a diagram of a query produced from the table result of FIG. 10 by the plan compiler that essentially produces a raw data stream.

FIG. 12 illustrates a diagram of the query of FIG. 11 with data grayed out that is to be ignored.

DETAILED DESCRIPTION

Figure 1:
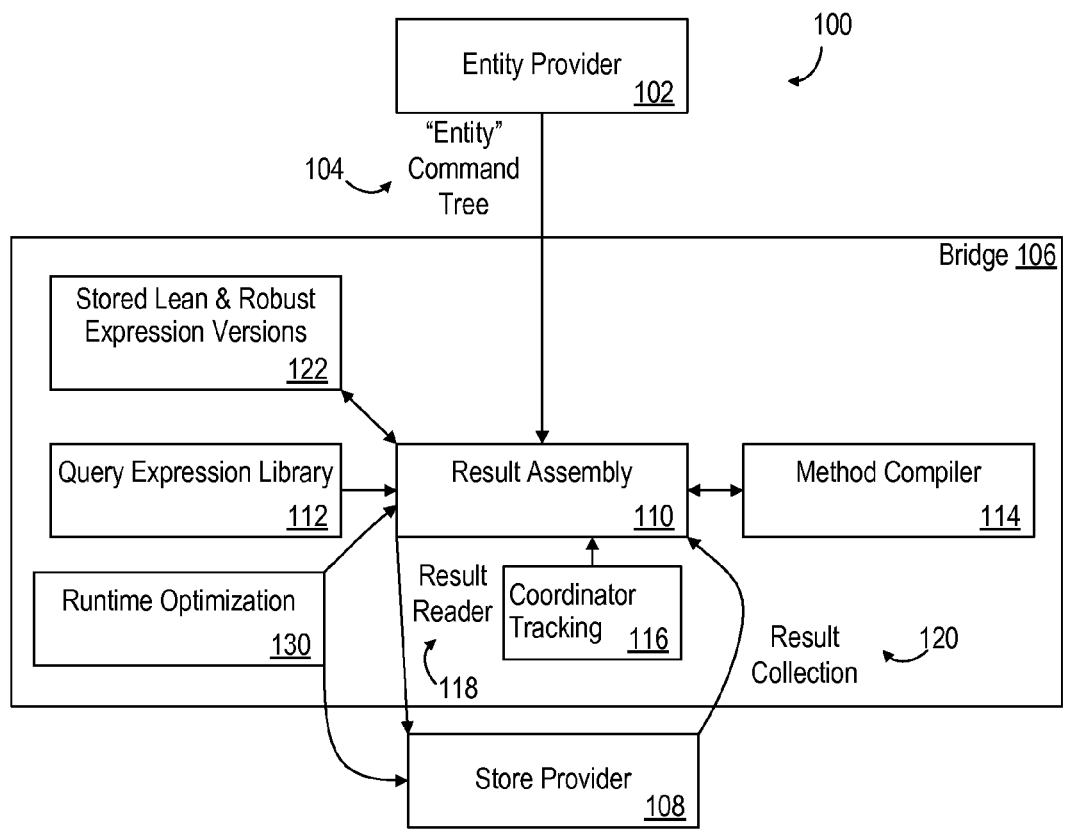
FIG. 1 illustrates a block diagram of an exemplary system that queries conceptual data of a store provider.

A result shaping methodology is part of a bridge (translation layer) between an entity provider and an underlying store provider. The bridge accepts command trees and parameter values from a consumer (e.g., the entity provider), reshapes the trees as necessary for its underlying store provider to execute, executes resulting commands, and assembles the results from the commands into the nested data reader that the initial command tree requested. The result assembly advantageously takes a mapping declaration and compiles it into a set of expression definitions composed from a small number of simple functions. Each collection in the result has a corresponding expression describing how collection elements are realized given relational results. Other expressions describe boundary detection behavior. These expressions are compiled into functions used to shape relational data into arbitrary object graphs or streaming interfaces. Alternative versions of the expressions for performance or graceful contextual error handling are also compiled.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "store," "device," "network," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Specifically, the subject innovation can be utilized with a variety of hardware configurations such as, but not limited to disability assisted input/output facilities, voice enabled input/output, tactile (e.g., Braille, etc.) keyboard, etc. Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 enables an entity provider 102 to submit queries conceptual data, depicted as entity command tree 104, via a bridge 106 to a store provider 108. Thereby, rectangular/relational result data from the store provider 108 can be reshaped into structured data, which can contain typed results, nested structures, and nested collections.

A result assembly 110 of the bridge 106 leverages an expression library 112 of a query language capable of describing a result shaping function. Simple functions are retrieved that are stateless so that can they can be used from cache without recompilation. Unlike compiling procedural methods, these functions can be compiled with less complexity by a method compiler 114. The multiplexed coordinators that are defined by the function expressions are maintained by a coordinator tracking component 116. Thus, when a result reader, depicted at 118, causes the store provider 108 to provide a result collection, depicted at 120, the particular coordinator or coordinators responsible for each row can be demultiplexed for aggregating the results.

With this enhanced two-way process, alternative versions of the compiled functions for result shaping can be maintained, depicted as a stored lean and robust expressions versions component 122. In particular, sub-expressions that provide for greater particularity in defining compiling errors can be modified to create a high performance "lean" expression. Alternatively, a graceful error handling "robust" expression can be used to give a consumer (e.g., entity provider 102) insights into the cause of the error. In some aspects, switching between use of the two versions is dynamically determined. For example, use of the lean version could be the default in order to achieve higher performance, recognizing that errors tend to be infrequent. The robust expression would be swapped out for a particular portion that is causing an error to more specifically determine the cause.

A runtime optimization component 130 enables optimization of shaping functions based on data available only at runtime from the backend database (store provider 108). For instance, we are able to tailor the shaping function to a specific column layout in the relational results. Rather than dynamically determine where the data can be found in the result set, we directly encode this knowledge in the shaping function.

Figure 2:
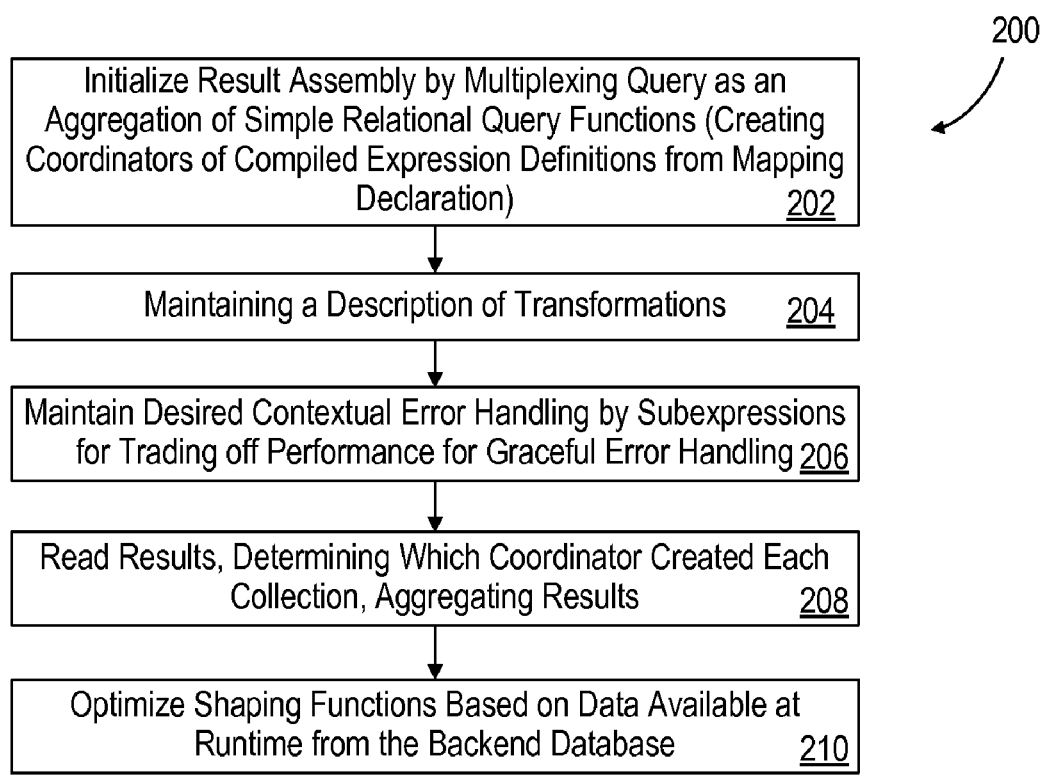
FIG. 2 illustrates a flow diagram of a methodology for performing a query of conceptual data of a store provider.

FIG. 2 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

A methodology 200 is provided for result shaping of transforming rectangular, relational data from a data store into arbitrarily structured results. In block 202, a set of expression definitions are compiled for a mapping declaration to initialize a result assembly. In particular, an aggregation of simple relational query functions is created as coordinators in response to a mapping declaration of an entity query.

In block 204, description of the transformations that make up the result shaping method are maintained. Thus, a plurality of coordinators are tracked that handle materialization respectively of results for each step of result assembly.

In block 206, contextual error handling sub-expressions are selectively maintained in one version of the expression definitions for dynamic error handling.

In block 208, the results are read, demultiplexing the query data results by identifying the coordinator or coordinators for each row of the query data results.

In block 210, a runtime optimization enables optimization of shaping functions based on data available only at runtime from the backend database. For instance, we are able to tailor the shaping function to a specific column layout in the relational results. Rather than dynamically determine where the data can be found in the result set, we directly encode this knowledge in the shaping function.

Figure 3:
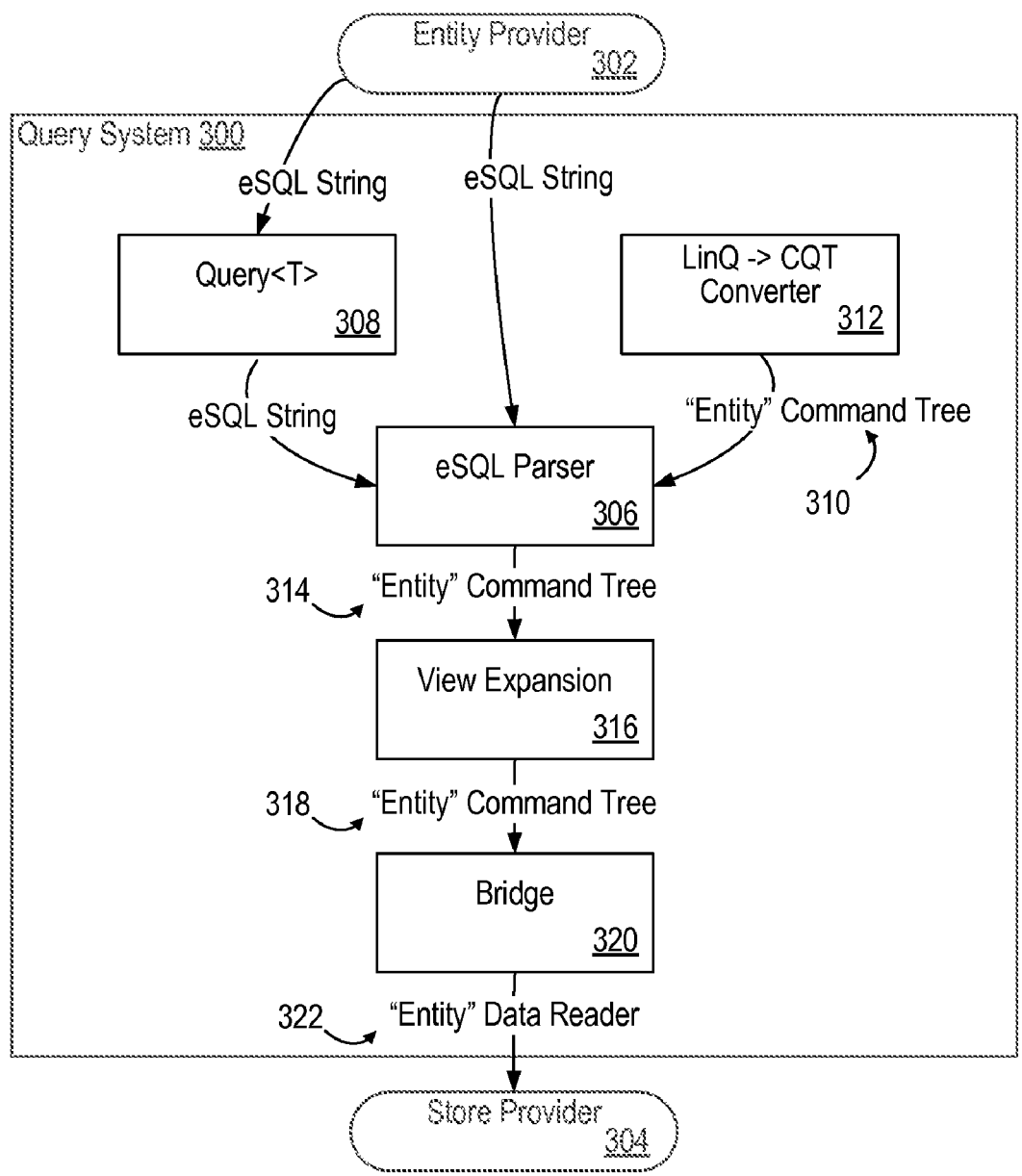
FIG. 3 illustrates a block diagram of a query system enables an entity provider (e.g., consumer) to work on a store provider.

In FIG. 3, a query system 300 enables an entity provider 302 (e.g., consumer) to work on a store provider 304 using eSQL strings, depicted as either passing directly to an eSQL parser 306 or first passing through a query<t> component 308. The parser 306 takes advantage of an entity command tree 310 provided by a converter 312, depicted as converting between LinQ and CQT. The conceptual data querying language in the exemplary implementation is Language Integrated Query (LINQ), a MICROSOFT™ .NET Framework component version 3.5 that adds native data querying capabilities to .NET and is a language using syntax reminiscent of SQL. LINQ defines a set of query operators that can be used to query, project and filter data in arrays, enumerable classes, XML, relational database, and third party data sources. When you formulate a query using LINQ, the LINQ to Entities layer translates the LINQ expression into an internal representation called CQT for Cannonical Query Trees, which is the same representation that results from parsing an Entity SQL statement. So once it's translated, it's handed out to the mapping layer, which will process it the exact same way independently of the fact that the query was initially formulated with LINQ or Entity SQL.

The eSQL parser 306 passes the "entity" command tree, as depicted at 314 to a view expansion component 316, which in turn passes the "entity" command tree as depicted at 318 to a bridge 320 that outputs an "entity" data reader 322 to the store provider 304.

The bridge 320 is the translation layer between the entity provider 302 and the underlying store provider 304 that the entity provider 302 is working with. The primary function of the bridge 320 is to accept command trees 318 and parameter values from the consumer (typically the entity provider 302), reshape the trees as necessary for its underlying store provider 304 to execute, execute the resulting commands, and assemble the results from the commands into the nested data reader 322 that the initial command tree 318 requested.

Figure 4:
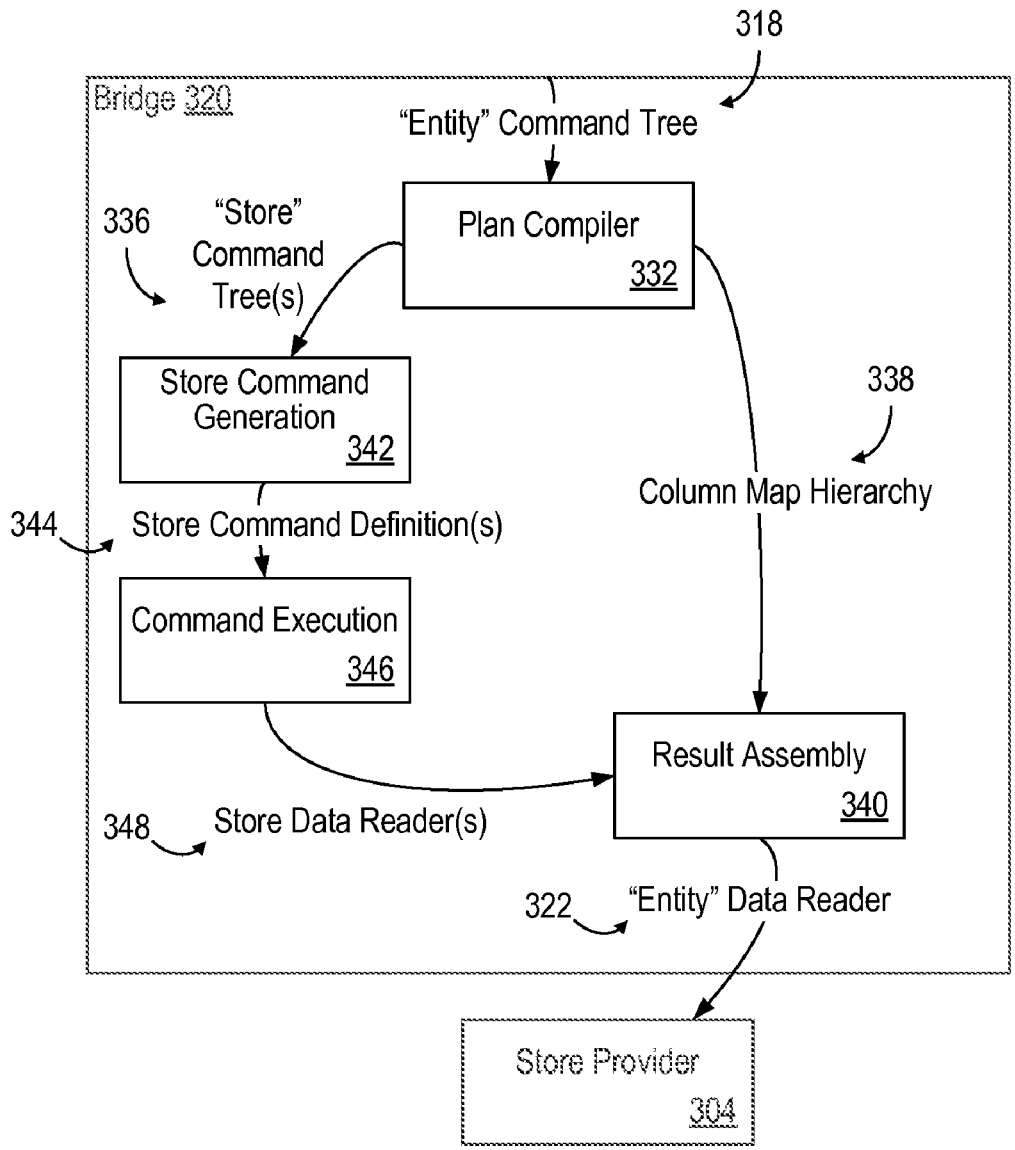
FIG. 4 illustrates a block diagram of a bridge of the query system of FIG. 3.

In FIG. 4, in one aspect, the bridge 320 is not a single component, but rather a set of related components. A plan compiler 332 transforms a high-level command tree 318 in entity terms into lower-level command tree 336 in store provider terms that can be executed by a data store 304 that has capabilities equivalent to SQL Server 2000. Specifically, the plan compiler 332 gets rid of constructs like type constructors, nesting etc, from the user query, converts the user query into one or more flat relational queries, along with reassembly information. In addition, the plan compiler 332 produces the column map instructions 338 that a result assembly component 340 uses to assembly the data returned when the command trees 336 are executed into the proper shape.

A store command generation component 342 of the bridge 320 constructs a DbCommand object ("store command definition(s)") 344 for each store command tree 336 that the plan compiler 332 produces. This component 342 relies upon new interfaces that the data store's ADO.NET Data Provider (not shown) implements to support the generating of these commands 336. In many cases, the store provider 318 implements a SQL Generation component (not shown) to translate the command tree into a command text of their native SQL dialect.

A command execution component 346 of the bridge 320 executes the store commands 336, producing a set of store data readers 348 that contain the raw data, and performing the initialization process for the result assembly component 340.

The result assembly 340 of the bridge 320 applies the column map instructions 338 that the plan compiler 332 produced to the raw data coming from the store data readers 348 that the command execution component 346 produced and returning a data reader 322 in the shape that the original entity command tree requested.

In an illustrative implementation, the first two components, the plan compiler 332 and the store command generation component 342, occur in the constructor of the EntityCommandDefinition, while the command execution component 346 and the initial setup for the result assembly component 340 occur in the internal Execute( ) method the EntityCommandDefinition. In addition, the result assembly component 340 is an ongoing process that continues for the life of the data reader 322 returned.

Figure 5:
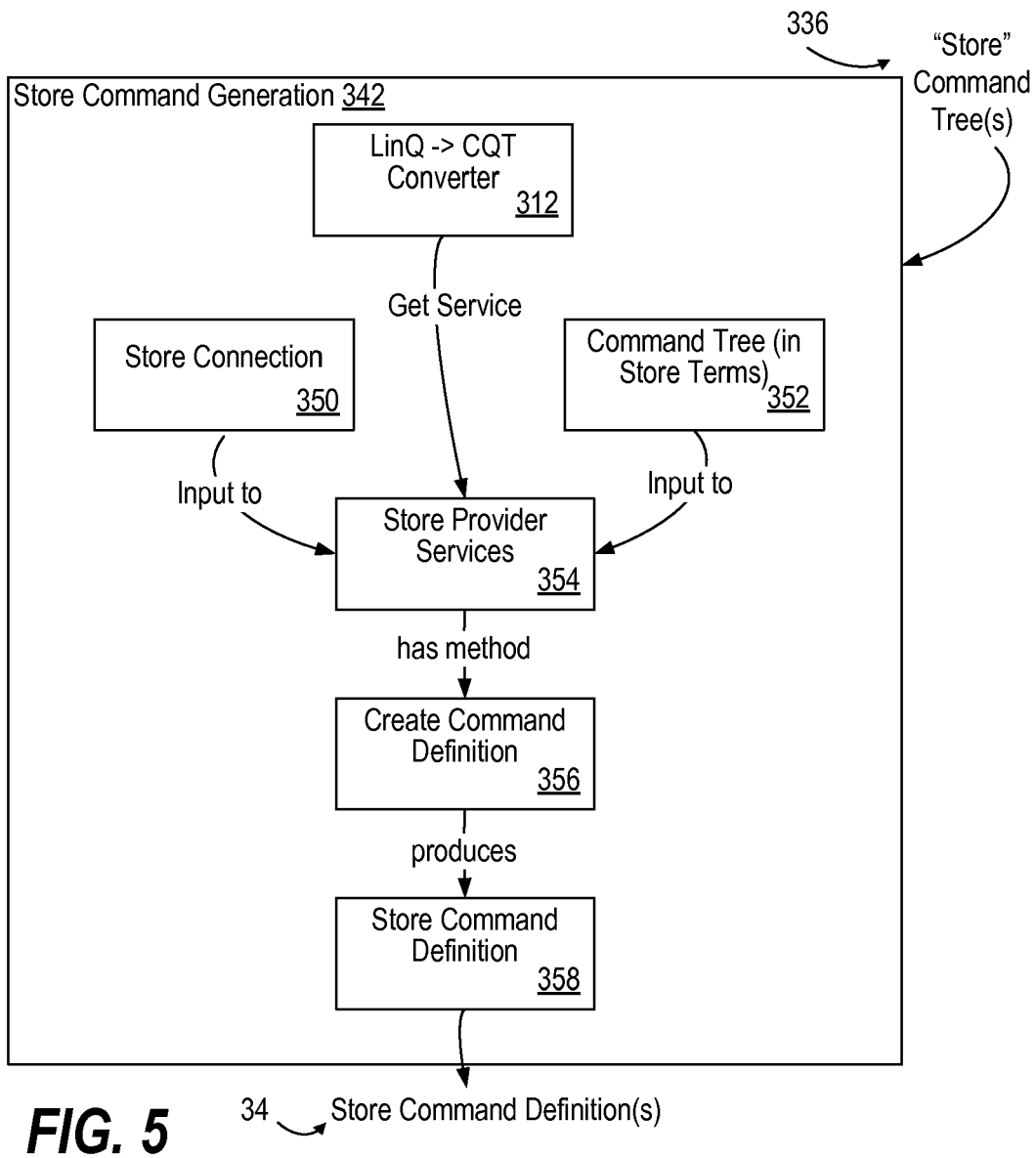
FIG. 5 illustrates a flow diagram of a store command generation of the bridge of FIG. 4.

In FIG. 5, an illustrative store command generation component 342 constructs a DbCommand object ("store command definition") for each store command tree 336 that the plan compiler component 332 (FIG. 4) produces. This component 342 relies upon new interfaces, store connection 350 and a command tree in store terms component 352 of ADO-.NET Data Provider ("store provider services") 354 of the data store 304. In most cases, the store provider 304 can implement a SQL Generation component ("create command definition") 356 to translate the command tree 336 into a command text ("store command definition") of their native SQL dialect.

Figure 6:
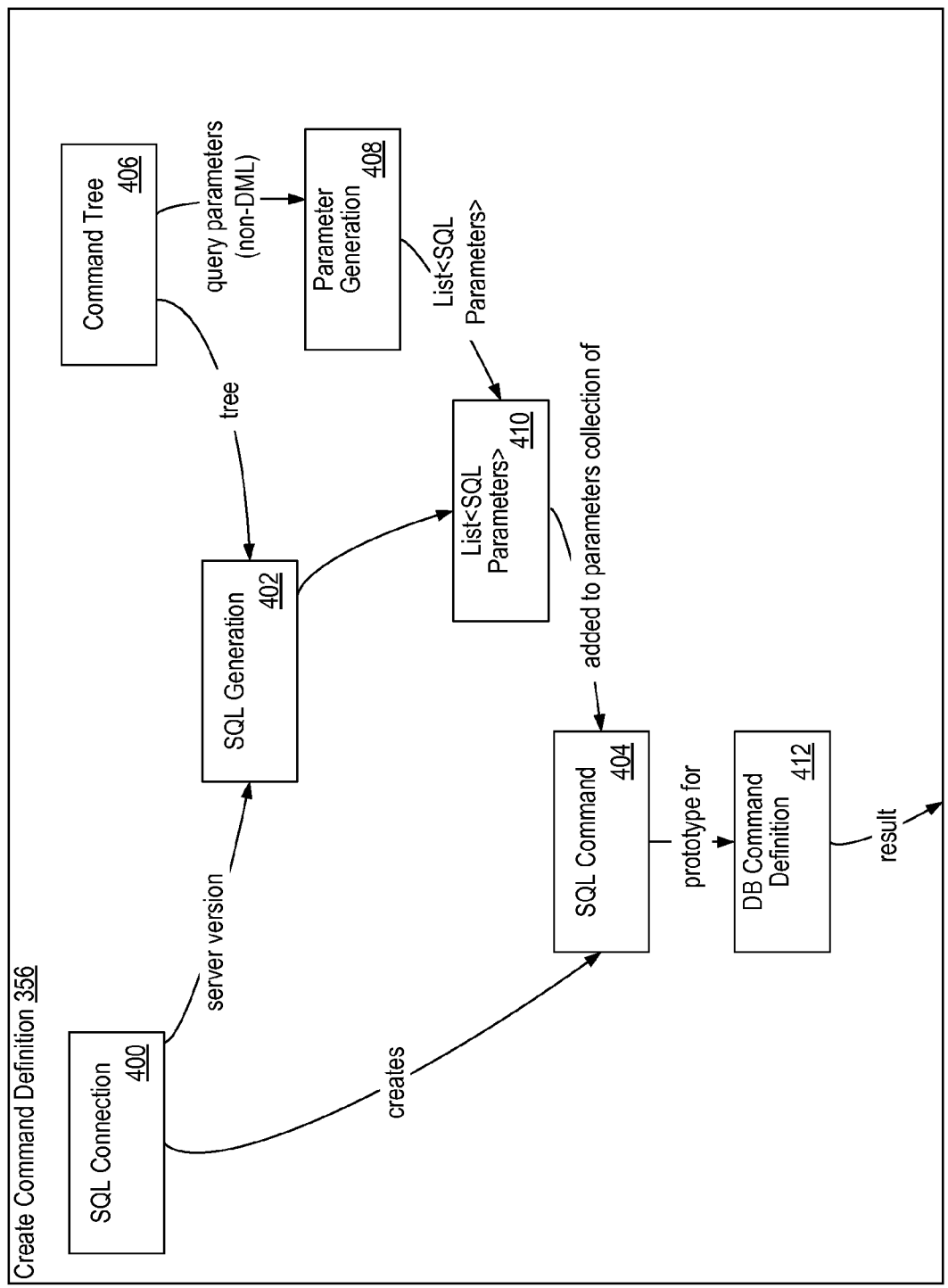
FIG. 6 illustrates a flow diagram of a create command definition for the store command generation flow of FIG. 5.

Drilling in a bit deeper, the following diagram of FIG. 6 illustrates how the CreateCommandDefinition method 344 for the SqlClient Provider functions. In SqlClient, we hand the store version number (from the provided SqlConnection object) and the provided command tree to its SQL Generation component, which produces a command text and (in the case of DML statements) a list of SqlParameter objects. In addition, we run each of the query parameters on the command tree specified through a ParameterGeneration method that builds SqlParameter objects from their TypeUsage. All of these are set on a SqlCommand object that is created using the CreateCommand method of the provided SqlConnection object. The resulting SqlCommand object is then handed to the DbCommandDefinition as its prototype, and that is what is returned.

Command Execution 356 can be relatively the simplest "component" of the bridge 320 (FIG. 3), the purpose of the CommandExecution component 356 is to execute the store commands, producing a set of store data readers that contain the raw data. A SQL connection 400 is depicted as providing a server version to a SQL generation component 402 and depicted as creating a SQL command component 404. The SQL generation component 402 receives a tree from a command tree component 406, which provides query parameter (non-DML) to a parameter generation component 408, which provides List<SQL parameter> to a List<SQL parameters> component 410 from the SQL generation component 402. This is added to the parameters collection of the SQL command 404, providing a prototype for a database (DB) command definition 412 for a result.

The internal Execute( ) method on the EntityCommandDefinition performs command execution process:

```
sealed public class EntityCommandDefinition :
    DbCommandDefinition {
        internal DbDataReader Execute(EntityCommand entityCommand,
CommandBehavior behavior)
    }
```

The Execute method loops over each of the DbCommandDefinition objects previously produced by the StoreCommandGeneration component (in the constructor of the EntityCommandDefinition), and for each one: (a) Creates a store command object from the command definition; (b) Sets the Connection, CommandTimeout, Site, Transaction and UpdateRowSource properties on the resulting store command object from the values on the EntityCommand object provided; (c) * Loops over the parameters on the store command object, and for each one that has a parameter of the same name on the provided EntityCommand object, sets the value from the EntityParameter found on the store parameter. (Note that it is not an error for there to be more parameters on the store parameter object, because some StoreCommandGeneration implementations may choose to parameterize constants on the query.); (d) Calls ExecuteReader the resulting store command object passing in the command behavior provided, or'ed with CommandBehavior.SequentialAccess. We do this to prevent the store data reader from doing any caching of data.

At this point, the command tree has been executed and control falls through to the initialization portion of the ResultAssembly component, which is described in the next section.

The ResultAssembly component 340 is responsible for applying the column map instructions that the PlanCompiler 332 produced to the raw data coming from the store data readers 348 that the CommandExecution component 346 produced and returning a data reader 322 in the shape that the original entity command tree 318 requested.

Figure 7:
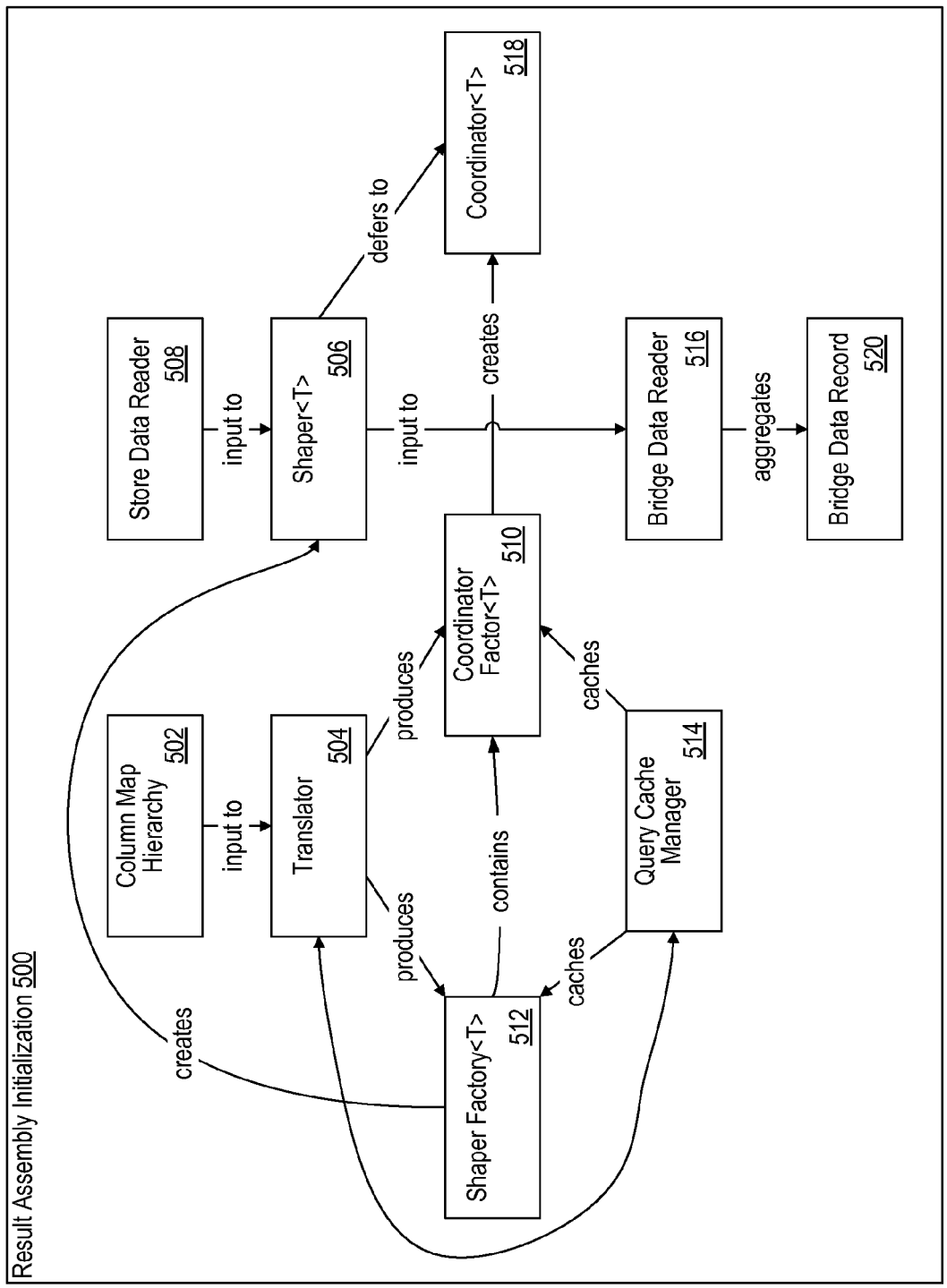
FIG. 7 illustrates an initialization flow diagram of result assembly of the bridge of FIG. 4.

There are essentially two portions to ResultAssembly 340: (1) The initialization portion, depicted in FIG. 7, which occurs as part of CommandExecution, and is responsible for initializing everything needed to perform the second portion. It returns the top-level data reader. (2) The process part that occurs as the data is being read from the top-level data reader (and all resulting data readers and data records) to actually carry out the assembly.

In more detail, a result assembly initialization methodology 500 has a ColumnMap hierarchy 502 produced by the PlanCompiler 332 (FIG. 4) is handed to a Translator 504, which produces Expressions which are eventually compiled into delegates.

These delegates, when executed, will do things such as determine whether there is any data for a collection, or materialize the objects. The delegates utilize a Shaper<T> instance 506 to gain access to the store data reader 508 and various pieces state. The delegates are compiled and stored on a CoordinatorFactory<T> object 510, the instructions about how the Shaper<T> objects 506 are to be constructed are stored on a ShaperFactory<T> class 512, along with a reference to the top-level CoordinatorFactory<T> object 510.

The ShaperFactory<T> class 512 is cached on a query cache manager 514, using a cache key constructed from the ColumnMap hierarchy 502. In this way, multiple queries that have different EntitySQL or LINQ expressions yet that have the same physical shape will use the same instructions.

The Translator class 504 will return this ShaperFactory<T>512 to its caller, (either a BridgeDataReader constructor 516, or the ObjectQueryExecutionPlan (not shown).

You can think of Coordinators 518 as the rules for how a collection result should be assembled, and the Shapers 506 as the class that stores the current state of all the collections for a given nested collection.

It should be appreciated with the benefit of the present disclosure that the "value-layer" returns readers and records with nested readers, and the "object layer" returns object iterators with nested collections. For value-layer object materialization: (a) The BridgeDataReader constructor 516 hands the storeDataReader 508 and metadataworkspace (not shown) from the connection to the ShaperFactory 512, and asks for a shaper 506 that will return RecordState objects. (b) The Shaper 506 produced and the Coordinator 518 it refers to are handed to the BridgeDataReader 516, which constructs a BridgeDataRecord 520 to handle the data and metadata retrieval tasks. (c) The resulting BridgeDataReader 516 is returned as the result of the EntityCommandDefinition.Execute method (not shown); this will in turn end up in the hands of the consumer, which will use the customary data reader patterns to read data from the result. For Object-Layer object materialization, ObjectQueryExecutionPlan stores this plan, and when the query is executed, it will hand it to the ObjectResult<T>, which is responsible for materializing the object results.

Figure 8:
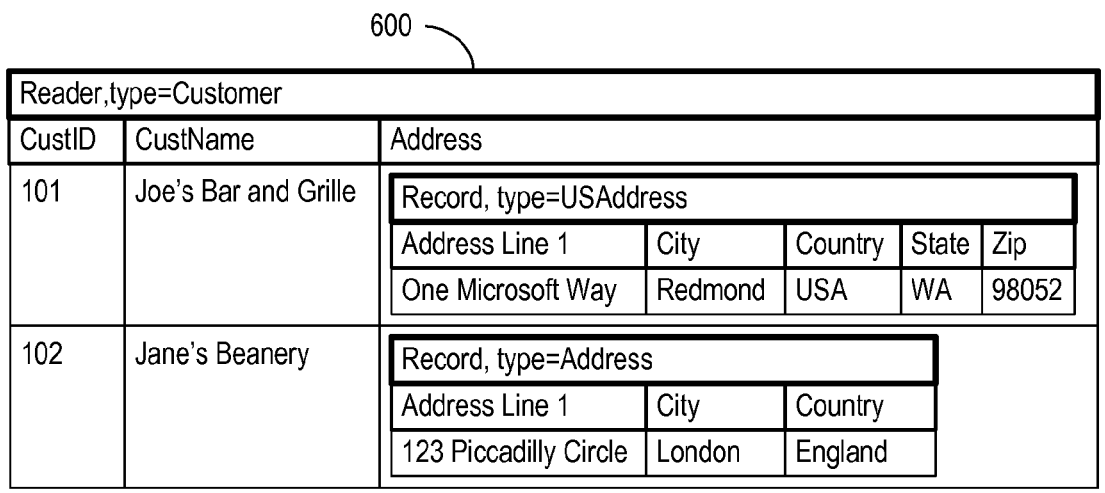
FIG. 8 illustrates a diagram of an exemplary table result with nested (polymorphic) structure types expected by a consumer.

As an overview of result assembly process, let's work through some examples to examine what the result assembly process is responsible for. In case of nested (polymorphic) types, here is the result that the consumer expects the Bridge to return, depicted at 600 in FIG. 8.

Figure 9:
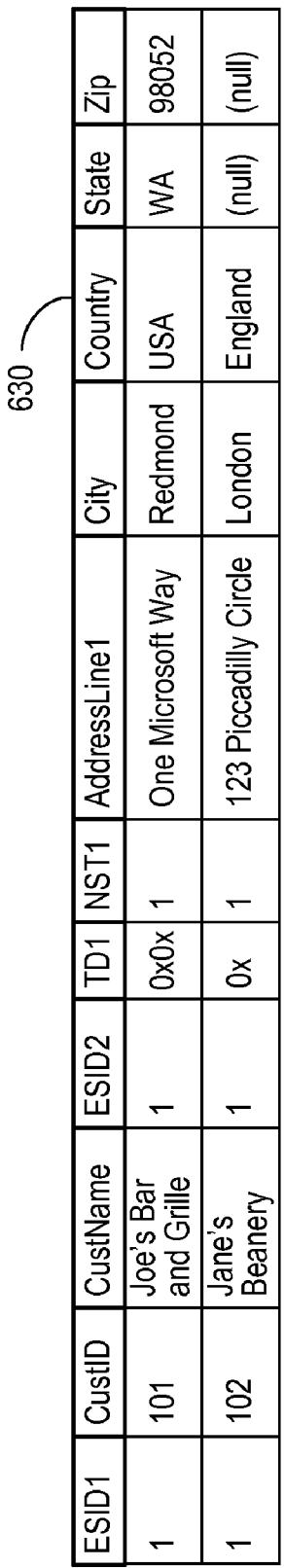
FIG. 9 illustrates a diagram of a query produced from the table result of FIG. 8 by a plan compiler that essentially produces a raw data stream.

In FIG. 9, the plan compiler generates a query that (essentially) produces the raw data stream as depicted at 630. In this case, we need to recognize which type the Address column should be constructed as.

Now let's consider a different and more complex example that the consumer expects the Bridge to return, depicted in FIG. 10 at 660. We are to create a data reader with two normal columns, and two nested collections.

The plan compiler generates a query that (essentially) produces the raw data stream as depicted at 680 in FIG. 11. Notice that the first row contains data for both the top-level customer, as well as the first row of its nested order collection. The second row repeats the top-level customer data, but contains the second row of its nested order collection. The Third row repeats the data for the top-level customer, but contains data for the first row of its nested contact collection instead of a row for the order collection, and so on.

In FIG. 12, data that is to be ignored is grayed out as depicted at 690 in the table 680. In this case, we need recognize when the data in the row: (1) Is for a different collection. (2) Is duplicated because of nested collections. As can be seen from the examples, the PlanCompiler inserted columns into the query. The four types of columns inserted into the stream are: (1) Type Discriminator columns, represented by the TD1 column in the first example, indicates which of the set of polymorphic types the data in the row represents; (2) Entity Set ID columns, represented by the ESID1, ESID2, and ESID3 columns in the examples, indicate which Entity Set the data in the row belongs to (came from); (3) Collection Discriminator columns, represented by the CD1 column in the second example, indicate which nested collection the data in the row belongs to; (4) Null Sentinel columns, represented by the NST1 column in the examples, indicate whether the entire record or complex type is null. If the value for this column is not null indicates that the corresponding record or complex is not null, and vice versa. It helps differentiate between a record or a complex type with all null properties and one that is null.

Each of these columns is added to the query to provide information to the ResultAssembly component to allow it to know what is in the row of the data stream. The expressions produced by the Translator and stored on the CoordinatorFactory look at the values of these columns and "discriminate" about what to return.

After each StoreRead is made on the Shaper's enumerator, it runs the root Coordinator's expression process to update the state of the State on the shaper to reflect what is in the row that the StoreDataReader currently has.

In summary, there are a few key concepts that for how the exemplary result assembly functions, such as consuming data versus skipping data. The store data reader is consumed sequentially. A single column of a structure may require multiple reads from the store data reader to skip over it. The Shapers and Coordinators ensure that all data for the column is consumed and discarded. When you're doing a Read from a BridgeDataReader, we end up consuming the rest of the data on the current row, which may involve multiple reads from the store, but at the end we will automatically be positioned exactly at the beginning of the next row.

Readers manage collection navigation; records manage structured types. The DataReaders surfaced in the Bridge essentially manage the navigation of their collection, while relying upon the DataRecords to manage returning data and metadata. This is done to minimize the amount of duplicate code, since every method of the DataRecord is also on the DataReader (but not the other way around). In addition, the Shapers for value-layer result assembly produce RecordState objects, which can include for both value-layer and object-layer materialization.

It should be appreciated with benefit of the present disclosure that Shaper<RecordState> is being utilized rather than Shaper<BridgeDataRecord>. The primary reason for this is that DataReaders are generally streaming, and there is no need to create a new record each time you need to return one. Simply re-using the old record (swapping current and next values) is far more efficient, maintaining performance.

These RecordState objects are stored in the State array in the Shaper. There is one RecordState for each polymorphic type the query can return, and the Element expression of the Coordinator will return the correct one based upon the type discriminators in the query.

The RecordState objects contain all the values for each of the columns (In fact there is a current and pending set of values, so we can be reading forward for nested collections without destroying column values for columns that come after the nested collection.

The "public" objects (BridgeDataReader and BridgeDataRecord) just delegate to their RecordState for state.

We manage the state of the Result Assembly on the RecordState because the "public" BridgeDataReader and BridgeDataRecord, being derived from public classes, do not provide enough typing to manage the state. Consider how you would handle Polymorphic types or the EntityRef hierarchy with those two objects alone. The RecordState provides a much more natural way to manage state. In practice, then, the public objects pretty much are facades around the RecordStates, relying upon them for all their work.

There are actually two enumerators. The Shaper object is an IEnumerable<T>. When the BridgeDataReader or the ObjectResult want to begin processing, the call the GetEnumerator method on the shaper, and it returns an IEnumerator<T>

For simple results that have no nested readers, we simply wrap the store data reader and do nearly nothing; each row belongs to the same collection, so there isn't any reason to do anything. This is the Shaper<T>.SimpleEnumerator class.

For results that have nested readers we need to "coordinate" which result is being returned. For this case, we use the Shaper<T>.NestedEnumerator class.

Nested enumerators for objects cache results, values do not.

One key item to note is that although both object-layer and value-layer materialization with nested collections use the same NestedEnumerator class, there is a difference in how it works for each of these.

Objects must materialize all objects from the bottom-up to produce the requested object graph, so they will cache all nested results in Lists, and return the top level objects only after all their children have been materialized.

Value-layer materialization, on the other hand, is intended to be streaming, and as such it returns each RecordState as it is found.

Figure 13:
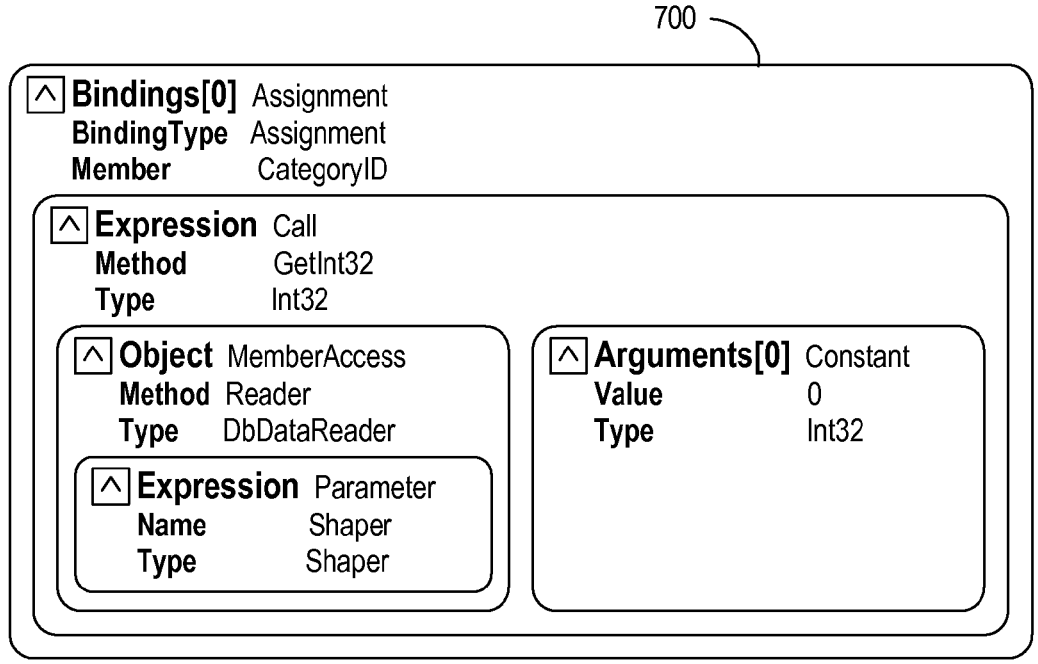
FIG. 13 illustrates a diagram of an expression optimized for performance.

With the visibility gained by tracking the transformations made to create the result, a range of trade-offs are possible between performance and error handling. In particular, while translating mapping declarations into expression trees, we annotate certain expression sub-trees to indicate an alternative (generally more expensive but also more helpful) representation of the same logic. When an error is encountered at runtime, we can rerun a particular branch and provide more useful context to the user. For instance, when realizing a "Category" entity we may generate the following expression to represent the initialization of the "CategoryID" property, depicted in FIG. 13 at 700. The call to GetInt32 may throw, but because the call appears within a larger expression, we cannot provide a specific reason for the failure to the user.

Figure 14:
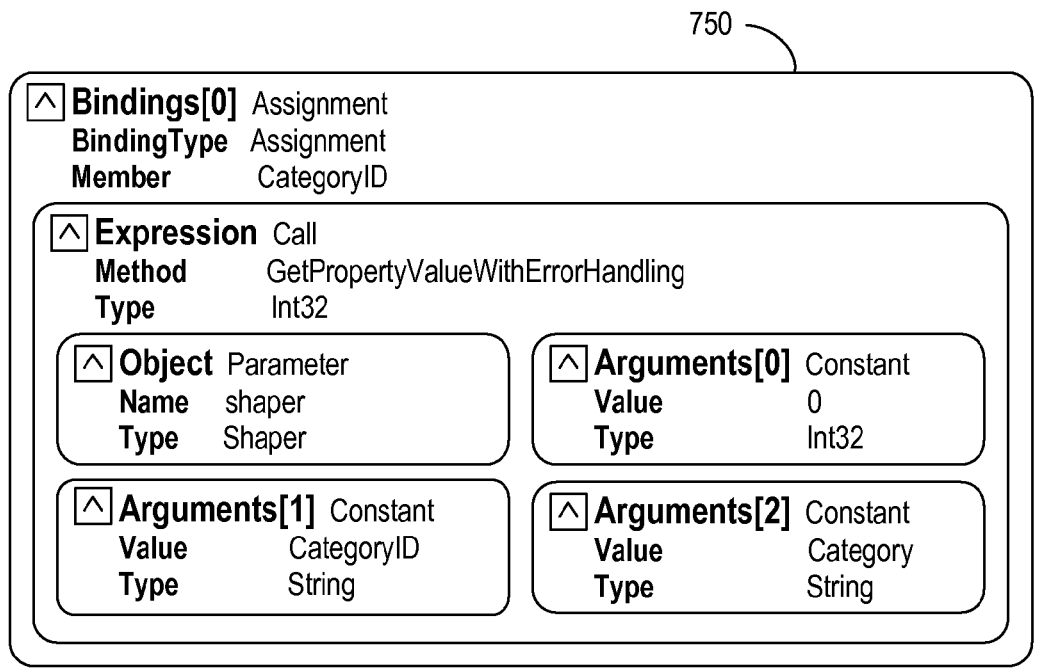
FIG. 14 illustrates a diagram of an alternative expression optimized for error handling.

Advantageously, we can in parallel produce a separate version of the expression depicted, in FIG. 14 at 750, that can be used in case of errors. Note that in this second example, the context for the operation (the type name "Category" and the property name "CategoryID") are captured. In addition, the call to GetPropertyValueWithErrorHandling replaces the call to DbDataReader.GetInt32, and is able to take its time figuring out the root cause of the error.

This kind of rewriting is possible because of the simple representation of the realization delegate functions. As a side-benefit, we can produce in a single code path two versions of the same logic without introducing explicit branches in the performant runtime function.

In the discussion above, System.Data.Objects.ObjectQuery<T> results (LINQ, CommandTree and Entity-SQL based) can be produced indirectly from store reader results by way of the BridgeDataReader, EntityDataReader and ObjectMaterializer. This layering is inefficient. An alternative strategy is to create results directly from the underlying store reader. To do this, we pay an upfront cost to compile a delegate (or a chain of delegates for nested results) that directly produces typed results given a store reader. To offset the high cost of emitting these delegates, they are cached.

Consider the following example. The user issues the following query:

```
var query = from c in context.Categories
    select new { Category = c, Products = c.Products };
```

The store query looks something like this:

```
SELECT c.CategoryID, c.CategoryName, p.ProductID, p.ProductName
FROM Categories AS c LEFT OUTER JOIN
    Products AS p ON c.CategoryID = p.CategoryID
ORDER BY c.CategoryID, p.ProductID
```

Assuming the results of the store query look something like this:

TABLE 1

| CategoryID | CategoryName | ProductID | ProductName |
|---|---|---|---|
| 1 | Beverages | 1 | Tea |
| 1 | Beverages | 2 | Coffee |
| 2 | Food | NULL | NULL |

We expected the following results:

TABLE 2

| Category | Products |
|---|---|
| {1, Beverages} | {1, Tea}, {2, Coffee} |
| {2, Food} | Empty |

Shaper. The Shaper is used by ObjectResult and by BridgeDataReader to materialize query results. The shaper exposes the root level coordinator for the query (see Section 4.3 for examples). When we begin to process results (GetEnumerator) from the store reader, the root coordinator becomes active. As new rows are read, we may transition to other coordinators, or yield results for the current coordinator. For an ObjectQuery, yielding really means aggregating; we don't return to the user until an entire top-level row has all of its results available. This allows the user to examine all data in the row without explicitly iterating over nested results. For reader scenarios, the user is expected to iterate of nested results, so yielding really means "telling the reader that the next result is available".

A coordinator decides it's time to yield a new result when its key has changed. For instance, the root coordinator's key in the reference example is 'CategoryID', and new results are yielded in the first and third rows.

The coordinator factory exposes the following compiled delegates to manage this state: (a) SetKeys: remembers the key values for the current result. Coordinator delegates use the Shaper.State object array to "remember" information. While the delegates are being compiled, we allocate space in this array. A coordinator calls this method when it begins processing a result; (b) CheckKeys: determines whether or not key values have changed. When the key values change, it tells us we've reached a boundary, and that it's time to yield some new results. This is called from the shaper's NestedEnumerator (through the coordinator's FindBoundary method) after each read from the store data reader. (c) Element: constructs a new element of the collection given values in the current store reader row. (d) ElementWithErrorHandling:

when something fails in the Element delegate, we call this to provide better error messages. It's just a transformation of the Element delegate that tries to isolate where the failure occurred. (e) HasData: determine whether the current store reader row has values for the current coordinator. For instance, the 'products' coordinator in the above example has no data in the third row. A lack of data tells us it's time to cede control to the next coordinator (this is particularly important where there are multiple nested coordinators at the same depth.).

As examples of coordinators, consider that a coordinator handles the creation of a particular result collection. Some queries require only a root level coordinator. For instance, the following example results in a single 'root' coordinator yielding Product instances:

```
ObjectResult<Product> result =
    context.Products.Execute(MergeOption.NoTracking);
```

Other queries have nested results. The following example contains a top-level coordinator but also two nested coordinators (siblings), one coordinating a nested products collection, the other coordinating a nested orders collection:

```
var query = context.Categories.Select(c => new {
Products = c.Products, Orders = c.Products.SelectMany(p => p.Orders) });
```

Coordinators can also be deeply nested, as in the following example where the nested products collection includes nested order collections:

```
var query = context.Categories.Select(c => new { Category = c,
    Products = c.Products.Select(p => new { Product = p,
    Orders = p.Orders } ) } );
```

A ColumnMap graph is translated into a shaper by the Translator class. Since a certain amount of state is maintained when results are being materialized, the output of the translator is actually a ShaperFactory, which supports the creation of new Shaper instance for every query. The factory instance is immutable (which allows it to be used in the query cache) but its output can maintain state specific to the current result stream. The coordinators used by the shaper follow a similar pattern (the ShaperFactory has a CoordinatorFactory; the Shaper has a Coordinator).

As we walk the ColumnMap graph, we construct a LINQ expression describing the Coordinator.Element delegate. While translation is performed, a CoordinatorScratchPad aggregates information about the coordinator hierarchy. This scratchpad can then be used to construct the coordinator hierarchy and the result shaper The overall approach is that as the Translator traverses the ColumnMap graph, it produces expressions for each structured type that gathers all the data for that structured type into a RecordState object. These RecordState objects are stored in the Shaper objects state array, and each unique type in a polymorphic type has its own RecordState.

The RecordState object maintains two separate object arrays—one for the current values and one for the pending values. This allows us to process nested collections without damaging column values that follow it in the record. The RecordState object also maintains the current and pending EntityRecordInfo objects if the record is the result of an Entity. The EntityKey property of the EntityRecordInfo changes from row to row so it cannot be static.

All static information about the records, such as the DataRecordInfo, the column names, the FieldNameLookup object, the Types are stored on a RecordStateFactory which is used to create the RecordState objects at runtime. These RecordStateFactory objects are stored on the CoordinatorFactory object that can return them. (And they are stored on the ShaperFactory that is cached)

Just as the Translator uses a CoordinatorScratchPad to aggregate the information for Coordinator objects, it uses a RecordStateScratchPad, which is stored on the CoordinatorScratchpad. When we build the CoordinatorFactory objects, we build the RecordStateFactory objects that are stored on them.

Two interesting methods on the RecordState are: (a) AcceptPendingValues: swaps the current and pending values and EntityRecordInfo objects; called from the BridgeDataReader when it's read a row. This is the only time we know the pending values are complete and that the current values are no longer needed. This is a recursive call, because there may be nested records in the values that also need to have their pending values accepted. (b) GatherData: when the Element expression on the Coordinator has determined that a specific RecordState should be returned, it calls the GatherData method on it which calls the GatherData expression on the RecordStateFactory. This expression will then call GetValue for each of the values that are to be part of the record from the store data reader and call SetColumnValue to ensure they're in the pending values. SetEntityRecordInfo is also called in this process.

EntityDataReader and ObjectQuery/ObjectResult have different requirements. The reader allows the user to access columns in each record sequentially. If a record contains a column containing a nested reader, the nested reader can also be accessed sequentially. On the other hand, the user accesses object results via an Ienumerator which exposes each element in its entirety. If there is a nested collection, its contents are aggregated and returned as part of the parent element. In both cases, relational results are shaped into structured results in a similar way, but the streaming and 'wholesale' exposure of these structures force us to parcel out the results in different ways.

To address this discrepancy, we introduce an additional layer of abstraction: an enumerator that translates every relational row to an array containing entries for every coordinator outputting a new result in the current row. For instance, the following query:

```
SELECT c, c.Address, c.Orders
FROM Customers as c
``` may result in the following rows and structures:

TABLE 3

| Step | Relational CustomerID | Name | CollDisc | AddressID | City | OrderID | Quantity | Coordinators array Depth0 | Key Depth1 | |
|---|---|---|---|---|---|---|---|---|---|---|
| 0 | Start | | | | | | | | | |
| 1 | C1 | Alice | 1 | A1 | Halifax | Null | Null | Customers | Addresses | C1 |
| 2 | C1 | Alice | 1 | A2 | Boston | Null | Null | Null | Addresses | C1 |
| 3 | C1 | Alice | 2 | Null | Null | O1 | 10 | Null | Orders | C1 |
| 4 | C2 | Bob | Null | Null | Null | Null | Null | Customers | Null | C2 |
| 5 | C3 | Charlie | 2 | Null | Null | O2 | 20 | Customers | Orders | C3 |
| 6 | C3 | Charlie | 2 | Null | Null | O3 | 30 | Null | Orders | C3 |
| 7 | End | | | | | | | | | |

When we read the first row (step 1), we encounter a new key value for the root coordinator (which yields "Customers"), and as a result determine there is a new customer. Based on the value of the collection discriminator column "CollDisc", we determine that the first row also contains an element of the "Addresses" coordinator. As a result, our coordinator array now contains the "Customers" and "Addresses" coordinators, at depths 0 and 1 respectively. Note that we use different criteria to determine whether there is a new customer and whether there is a new address. In the case of the customer, we have a key column "CustomerID" which is processed in the SetKeys and CheckKeys delegates. In the case of the address, we have a discriminator column "CollDisc" which is processed by the HasData delegate. Generally speaking, a coordinator may have both/either/neither keys nor discriminators.

In the second step, we encounter a new address. In this case, there coordinator at depth 0 is null indicating that there is no new root element (we're still reading "Alice").

In the fourth step, we encounter a new customer "Bob". He has no addresses and no orders, so in this case there is no coordinator at depth 1.

The row enumeration is interpreted differently for a reader result and an object result. In the reader result, we yield a RecordState every time a new element is produced at any depth. As a result, a particular row yields between 0 and n states. In the above example, we yield the following states at each step:

TABLE 4

| Step | Yielded states (Coordinator[Element]) |
|---|---|
| 1 | Customers[C1] |
|   | Addresses[A1] |
| 2 | Addresses[A2] |
| 3 | Orders[O1] |
| 4 | Customers[C2] |
| 5 | Customers[C3] |
|   | Orders[O2] |
| 6 | Orders[O3] |

For the object result, we return a result only when a new root level element is encountered. We actually return the previous element since we need to wait until all elements of its children have been loaded. With respect to the same example, we have:

TABLE 5

| Step | Previous | Current | Yield previous? |
|---|---|---|---|
| 0 | — | — | No |
| 1 | — | {C1, {A1}, { }} | No |

TABLE 5-continued

| Step | Previous | Current | Yield previous? |
|---|---|---|---|
| 2 | — | {C1, {A1, A2}, { }} | No |
| 3 | — | {C1, {A1, A2}, {O1}} | No |
| 4 | {C1 ... } | {C2} | Yes |
| 5 | {C2} | {C3, { }, {O2}} | Yes |
| 6 | {C2} | {C3, { }, {O2, O3}} | No |
| 7 | {C3 ... } | — | Yes |

If a result is "simple" (e.g. there is no nesting and no keys to check), we can use a simpler (common) pattern. We yield an element or record state for each relational row.

With regard to caching, the ObjectQueryCacheEntry includes a ShaperFactory. The factory allows us to skip recompilation of delegates, which can be expensive. Since multiple queries can have identical column maps (e.g., all queries that filter/order a particular entity set), we also independently cache the ShaperFactory. The key for these entries is a representation of the column map. Related classes: (a) ColumnMapKeyBuilder: constructs a string serving as the identifier for a column map graph. (b) ShaperFactoryQueryCacheEntry: a cache entry which stores the ShaperFactory instance. (c) ShaperFactoryQueryCacheKey: used to lookup factories in the cache. Uses the identifier built by ColumnMapKeyBuilder.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Figure 15:
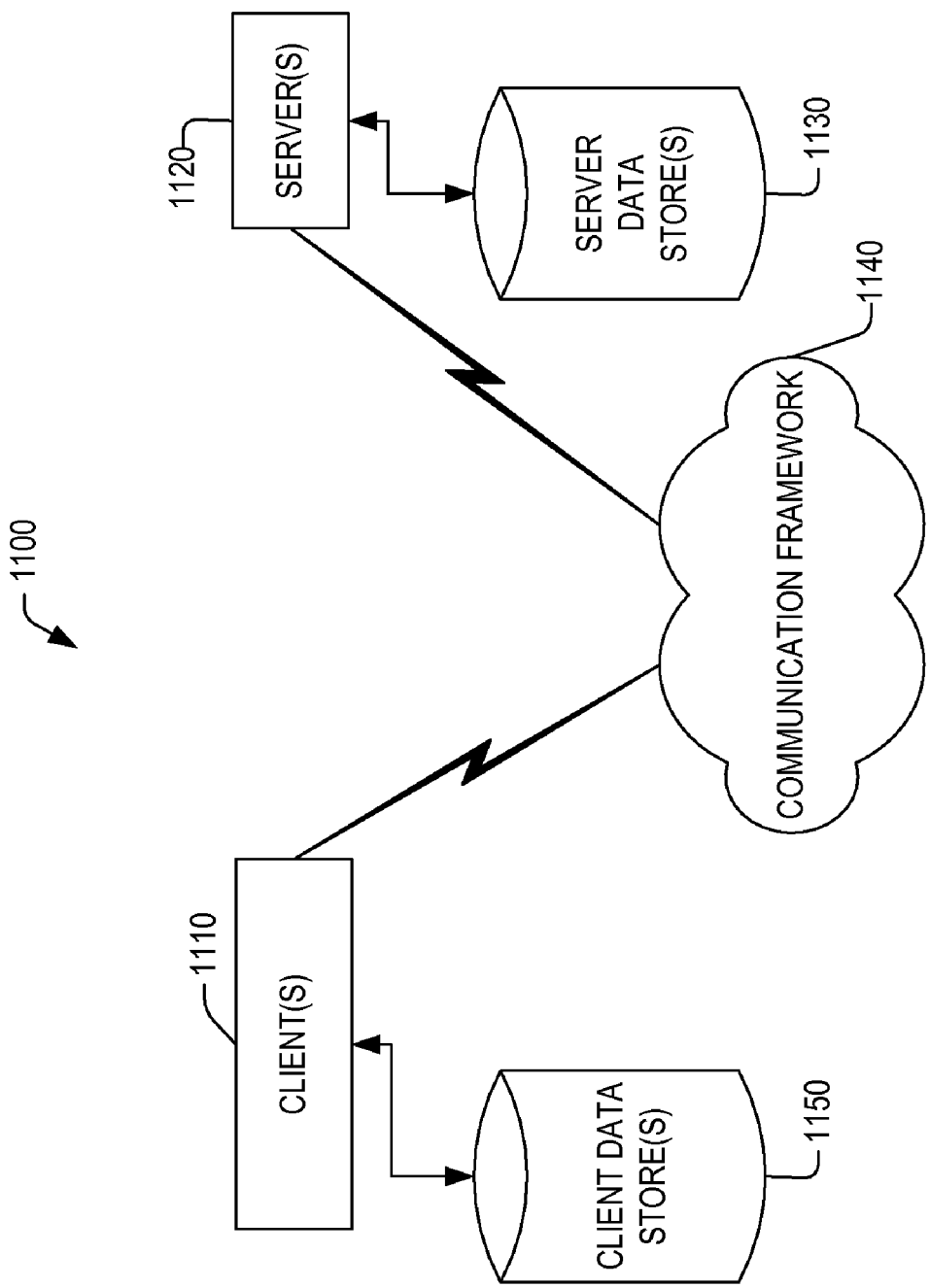
FIG. 15 illustrates an exemplary networking environment, wherein the novel aspects of the claimed subject matter can be employed.

FIG. 15 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

Figure 16:
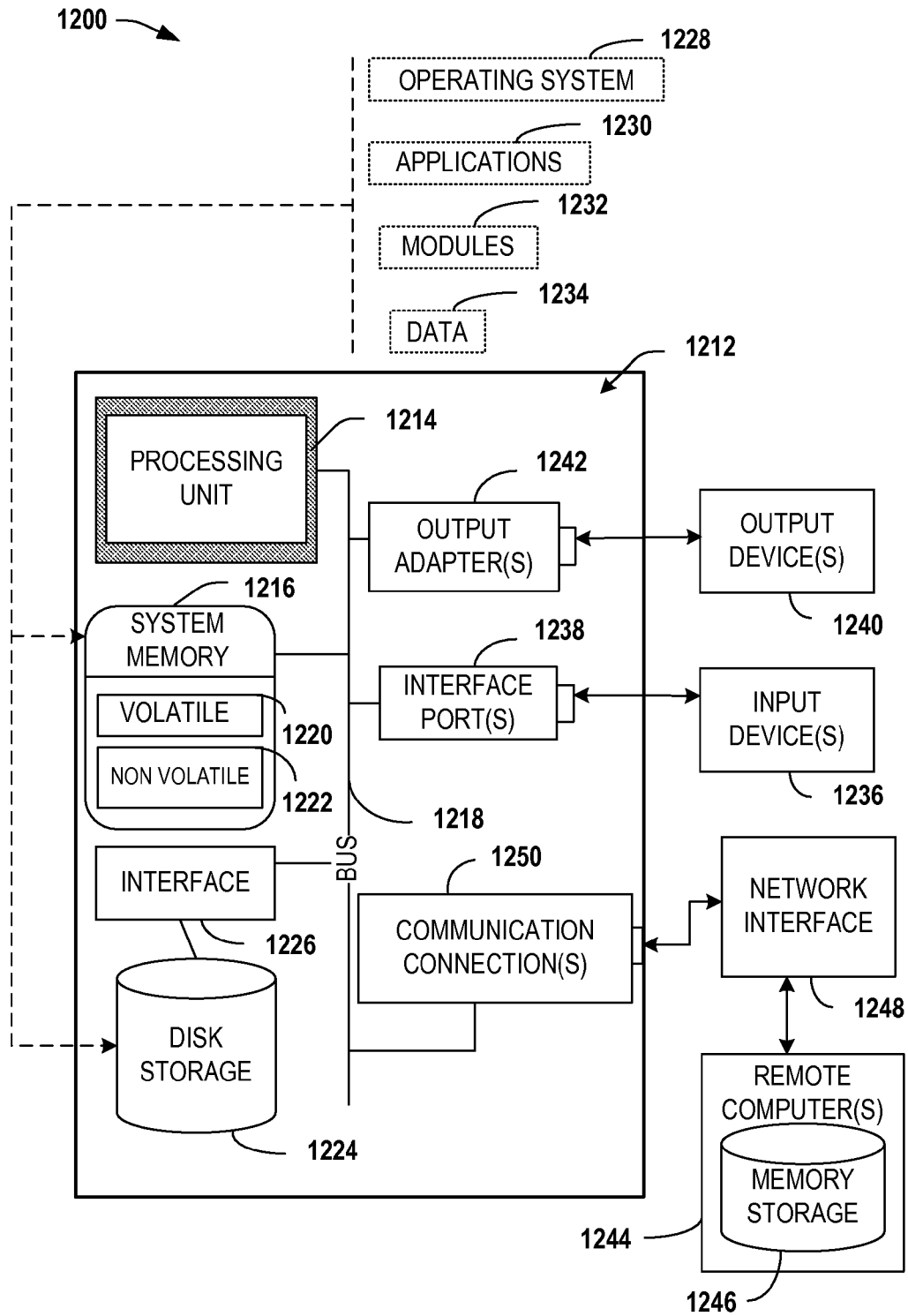
FIG. 16 illustrates an exemplary operating environment that can be employed in accordance with the claimed subject matter.

With reference to FIG. 16, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 16 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 16 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method, comprising:
accepting, from a data consumer, a consumer command tree expressed in consumer terms;
transforming the consumer command tree into a provider command tree expressed in provider terms, wherein the transforming leverages an expression library of a query language that facilitates describing a result shaping function, and wherein alternative versions of compiled functions for result shaping are maintained;
producing column map instructions that indicate how to group columns and how to group rows;
executing the provider command tree to produce at least one store data reader containing data;
applying the column map instructions to the data contained in the at least one store data reader to produce a data reader corresponding to the consumer command tree; and
compiling a set of expressions including stateless functions usable in a cache without recompilation.

2. The method of claim 1, further comprising parsing a query corresponding to the consumer command tree.

3. The method of claim 2, further comprising receiving an extended structured query language (eSQL) string in the query.

4. The method of claim 2, the transforming including eliminating at least one of a type constructor or a nesting construct from the query.

5. The method of claim of claim 2, the transforming including converting the query into a relational query.

6. The method of claim 5, further comprising translating the consumer command tree into an SQL dialect.

7. The method of claim 5, further comprising receiving the query expressed in a language integrated query (LINQ) language.

8. The method of claim 1, further comprising creating a coordinator to materialize a particular result collection.

9. The method of claim 8, further comprising defining a key demarcating a boundary or chapter for a coordinator whose change indicates a new result.

10. The method of claim 1, further comprising describing transformations needed to take results of executing a relational store command to produce post-relational entity results in a column map by telling a materializer how to group the columns in complex types of sub-structures and how to group the rows into inline collection nested results.

11. The method of claim 1, further comprising optimizing a result shaping function by tailoring based upon data available at runtime.

12. An apparatus, comprising at least one processor coupled to at least one machine-readable storage medium storing instructions executable by the at least one processor to implement:
a compiler component configured to:
receive a data query command tree from a data consumer;
transform the data query command tree into a lower-level command tree expressed in data provider terms by leveraging an expression library of a query language that facilitates describing a result shaping function, wherein alternative versions of compiled functions for result shaping are maintained;

produce reassembly information that includes column map instructions indicating how to group columns and how to group rows; and compile a set of expressions including stateless functions usable in a cache without recompilation;

a store command generator component configured to:
construct at least one store command definition corresponding to the lower-level command tree;

a command execution component configured to:
produce at least one store data reader based on the at least one store command definition; and a results assembly component configured to:
apply the reassembly information to an output of the at least one store data reader to produce a data reader corresponding to the data query command tree from the data consumer.

13. The apparatus of claim 12, further comprising a component configured to
remove sub-expressions for error handling from an expression to enhance performance, and
substitute an expression with included error handling sub-expressions in response to receiving a compiler error.

14. The apparatus of claim 12, further comprising a component configured to
retrieve an expression definition from the expression library for the query language, and
compile a set of expression definitions by composing expressions from a plurality of functions.

15. The apparatus of claim 12, further comprising a component configured to
create a coordinator to materialize a particular result collection, and define a key demarcating a boundary or chapter for a coordinator whose change indicates a new result.

16. The apparatus of claim 12, further comprising a component configured to describe transformations needed to take results of executing a relational store command to produce post-relational entity results in a column map by telling a materializer how to group the columns in complex types of sub-structures and how to group the rows into inline collection nested results.

17. The apparatus of claim 12, further comprising a component configured to optimize a result shaping function by tailoring based upon data available at runtime.

18. A computer-readable storage medium storing instructions, the instructions when executed by a computing device causing the computing device to perform operations comprising:
accepting at least one consumer command tree and parameter value from a data consumer;
applying a compiler to the at least one consumer command tree and parameter value to produce at least one store command and column map instructions, the column map instructions indicating how to group columns and how to group rows, wherein the applying leverages an expression library of a query language that facilitates describing a result shaping function, and wherein alternative versions of compiled functions for result shaping are maintained;
compiling a set of expressions including stateless functions usable in a cache without recompilation;
constructing at least one store command definition based at least partly on the at least one store command;
executing the at least one store command based at least partly on the at least one store command definition to produce at least one store data reader containing data; and
applying the column map instructions to the data contained in the at least one store data reader to output at least one producer data reader corresponding to the at least one consumer command tree.

19. The non-transitory computer-readable storage medium of claim 18, the operations further comprising:
removing sub-expressions for error handling from an expression; and
substituting an expression with included error handling sub-expressions in response to receiving a compiler error.

* * * * *